(12) United States Patent
Sikora et al.

(10) Patent No.: US 8,310,340 B2
(45) Date of Patent: Nov. 13, 2012

(54) RADIO METHOD FOR DOORS

(75) Inventors: Axel Sikora, Heitersheim (DE); Eldor Walk, Heistenbach (DE)

(73) Assignee: Feig Electronic GmbH, Weilburg-Waldhausen (DE)

( * ) Notice: Subject to any disclaimer, the term of this patent is extended or adjusted under 35 U.S.C. 154(b) by 1181 days.

(21) Appl. No.: 12/143,280

(22) Filed: Jun. 20, 2008

(65) Prior Publication Data

US 2008/0315988 A1 Dec. 25, 2008

(30) Foreign Application Priority Data

Jun. 22, 2007 (EP) ..................................... 07110894

(51) Int. Cl.
*G04B 1/00* (2006.01)

(52) U.S. Cl. ......................................... 340/5.71; 340/5.7

(58) Field of Classification Search .................. 340/5.7, 340/5.71
See application file for complete search history.

(56) References Cited

U.S. PATENT DOCUMENTS

| | | | |
|---|---|---|---|
| 4,027,276 A | | 5/1977 | Shaughnessy |
| 5,377,222 A * | | 12/1994 | Sanderford, Jr. .............. 375/131 |
| 5,412,297 A | | 5/1995 | Clark et al. |
| 6,317,714 B1 * | | 11/2001 | Del Castillo et al. ......... 704/270 |
| 6,317,797 B2 * | | 11/2001 | Clark et al. ........................ 710/5 |
| 6,346,889 B1 | | 2/2002 | Moss |
| 7,123,144 B2 | | 10/2006 | Anderson et al. |
| 7,124,368 B1 * | | 10/2006 | Subramanian et al. ....... 715/736 |
| 7,245,649 B2 * | | 7/2007 | Haartsen ........................ 375/132 |
| 7,289,014 B2 * | | 10/2007 | Mullet et al. .................... 340/5.7 |
| 7,301,480 B2 * | | 11/2007 | Fitzgibbon .................... 340/933 |
| 2001/0044280 A1 * | | 11/2001 | Samuels .......................... 455/77 |
| 2002/0183008 A1 | | 12/2002 | Menard et al. |
| 2004/0072582 A1 * | | 4/2004 | Aljadeff et al. ............. 455/456.1 |
| 2004/0077383 A1 | | 4/2004 | Lappetelainen et al. |
| 2005/0017663 A1 | | 1/2005 | Anderson |

(Continued)

FOREIGN PATENT DOCUMENTS

DE  4313 062 C 2  10/1994

(Continued)

OTHER PUBLICATIONS

IEEE Standard for Information Technology—Telecommunications and information exchange between systems—local and metropolitan area networks—specific requirements, Part 11: Wireless LAN Medium Access Control (MAC) and Physical Layer (PHY) Specifications; IEEE Std. 802.11™-2007, Jun. 12, 2007.

(Continued)

*Primary Examiner* — Jennifer Mehmood
*Assistant Examiner* — Naomi Small
(74) *Attorney, Agent, or Firm* — Smith Gambrell & Russell LLP

(57) ABSTRACT

A radio method for doors in the 2.4 GHz frequency band with operating channels, wherein a stationary unit is bidirectionally networked by means of a wireless radio connection with at least one battery-powered mobile unit and uses a frequency-hopping method, wherein channel hops are executed in a time raster between 0.625 ms and 10 ms, the channels used for the frequency-hopping method are adaptively selected, at least one complete communication cycle takes place on one channel within the time raster, the number of transmitted data is adapted to the useful data that must be transmitted, the synchronization for establishment of a connection between the stationary unit and the mobile unit takes place on a synchronization channel.

21 Claims, 2 Drawing Sheets

U.S. PATENT DOCUMENTS

| | | |
|---|---|---|
| 2005/0118954 A1 | 6/2005 | Nielsen et al. |
| 2005/0253710 A1 | 11/2005 | Eskildsen |
| 2006/0028157 A1 | 2/2006 | Ying |
| 2006/0109079 A1 | 5/2006 | Mack |
| 2006/0126561 A1* | 6/2006 | Jose .............................. 370/330 |
| 2006/0188004 A1 | 8/2006 | Kizu et al. |
| 2007/0080824 A1 | 4/2007 | Chen et al. |
| 2008/0164973 A1* | 7/2008 | Mamaloukas ................. 340/5.7 |
| 2008/0231441 A1 | 9/2008 | Schafer |
| 2008/0231442 A1 | 9/2008 | Schafer et al. |
| 2009/0036057 A1 | 2/2009 | Nielsen et al. |

FOREIGN PATENT DOCUMENTS

| | | |
|---|---|---|
| DE | 4313 063 C | 10/1994 |
| DE | 296 06 569 U 1 | 9/1997 |
| DE | 296 23 251 U 1 | 3/1998 |
| DE | 100 00 641 C1 | 1/2000 |
| DE | 103 02 812 A1 | 8/2004 |
| EP | 1 722 339 A1 | 5/2005 |
| EP | 1 686 699 A2 | 8/2006 |
| EP | 2107691 A1 | 10/2009 |
| JP | 11004277 A * | 1/1999 |
| JP | 2007158485 A * | 6/2007 |
| WO | WO 03/056530 | 7/2003 |

OTHER PUBLICATIONS

IEEE Standard for Information Technology—Telecommunications and information exchange between systems—local and metropolitan area networks—specific requirements, Part 15.1: Wireless medium access control (MAC) and physical layer (PHY) specifications for wireless personal area networks (WPANs); IEEE Computer Society, Jun. 14, 2005.

IEEE Standard for Information Technology—Telecommunications and information exchange between systems—local and metropolitan area networks—specific requirements, Part 15.4: Wireless medium access control (MAC) and Physical Layer (PHY) Specifications for Low-Rate Wireless Personal Area Networks (WPANS), IEEE Computer Society; IEEE Std. 802.15.4™-2006, Sep. 8, 2006.

European Search Report issued on Mar. 10, 2008 for European application No. EP 07/110894.8.

European Search Report for EP 07 11 1823 released Jan. 29, 2008.

* cited by examiner

| D1 | D2 | D3 | D4 | D5 | D6 | D7 | D8 | D9 | ... | D79 |
|---|---|---|---|---|---|---|---|---|---|---|
| 0 | 0 | 0 | 1 | 1 | 0 | 1 | 0 | 0 | | 1 |
| S3 | | | S1 | | S2 | | | | | |

RADIO METHOD FOR DOORS

CROSS-REFERENCE TO RELATED APPLICATIONS

This patent application is based on and claims convention priority under 35 U.S.C Section 119 on European patent application no. EP 07/110894.8 filed on Jun. 22, 2007, which is relied upon and incorporated herein in its entirety.

BACKGROUND OF THE INVENTION

The invention relates to a radio method for doors.

Numerous and diverse requirements are imposed on a radio method for doors, especially when individual components that execute the radio method are battery-powered.

To ensure a long useful life for the battery, one requirement to be met by a radio method for doors is that the radio method is permitted to have only a small energy demand.

Since standard practice for battery-powered components is to activate such components only as needed, a radio method for doors must be capable of establishing a connection between the battery-powered component and the stationary door controller quickly and reliably, while at the same time ensuring that the connection is established exclusively between the stationary door controller and the mobile units allocated thereto and not with components that by chance are also within its radio-sensing range, as could be the case, for example, of mobile units of a door controller present in the vicinity or of other radio systems that by chance are present in the vicinity, such as mobile telephones or mobile computer systems equipped with WLAN or Bluetooth transmitter/receiver systems.

Since safety-related data, such as detection of an obstruction in the zone of the door, can also be transmitted with a radio method for doors, data exchange must be possible rapidly and must be largely immune to interferences from the surroundings, for example due to other radio systems.

In order to ensure safe operation of a door, especially when the door is a high-speed door that moves at 1 to 2 meters per second, for example, a radio method for doors must be able to transmit safety-related data in real time, which in this case means a necessary reaction time of less than 5 ms.

In order to comply with the diverse legal basic conditions that exist throughout the world for operation of radio systems, it is important for a cost-effective radio method for doors that the radio method use a frequency band that is approved for unlicensed operation of radio systems in almost all countries. Consequently, however, the radio method must be designed such that it also operates reliably in coexistence with other radio services that use the same frequency band.

A further requirement imposed on a radio system for doors is that the needed hardware components be as inexpensive as possible and ensure high reliability for many years of operation on the door.

From the prior art there are already known several solutions in which, for example, a battery-powered transmitter or a transmitter/receiver is mounted on the safety strip of a door in such a way that it can communicate unidirectionally or bidirectionally with a door controller via a radio link.

As an example, DE 10000641 C1 describes a device for motor-driven doors, wherein the measured values delivered by the safety strip are communicated by radio to a stationary door controller that receives these radio signals. To ensure the necessary safety, this device is equipped with two transmitters, in order to transmit the information redundantly at different frequencies to the door controller. However, this device has the disadvantage that it needs two independent transmitters on the safety strip, making it complex and expensive, and that the transmitters do not have the ability to adjust to a different transmission frequency if the transmission channel that they are using is being used by another radio system or is otherwise faulty. Furthermore, this device does not have any features to ensure that the radio signals of the protective device can be processed only by the door controller allocated to them.

Also known from the prior art (DE 10302812 B4) is a device that saves electric energy by waking the riding unit cyclically, in order to detect whether a signal indicating that the stationary door controller is requesting further operation of the riding unit can be measured by the stationary door controller. This prior art device has the disadvantage that the riding unit cannot distinguish whether the received signal originates from the door controller allocated to it or from another transmitter. Thus undesired activation of the riding unit can occur easily, thus negatively affecting the battery life. Furthermore, this prior art also does not provide any indication as to how reliable operation can be ensured if further radio systems are present in its zone of action.

From the prior art (U.S. Pat. No. 4,027,276) there is known a radio system for a door wherein a receiving device is capable of receiving and separating the signals of a plurality of transmitting devices. For this purpose, the transmitting device is equipped with means whereby a 200 megahertz (MHz) to 400 MHz transmitted signal can deliver, via an electronic circuit, an encoded signal in the form of pulses, and with a receiving device that can receive the signals encoded in this way and identify the device from which the signal was sent on the basis of the coding. This prior art device has the disadvantage that the specified frequencies and encoding make high-speed data transmission impossible and that a collision of a plurality of transmitted signals sent out simultaneously cannot be separated by the receiving device, thus potentially causing breakdown of data transmission.

Also described in the prior art (EP 1722339 A1) is a method for ensuring, by alternating transmission, reception and checking of identification numbers between a stationary unit and a mobile unit, that each communication partner has received the respective information intended for it. This method also has the disadvantage of not providing any steps for ensuring reliable communication in the case of collision of a plurality of transmitters that are transmitting simultaneously on the same channel.

Also known from the prior art are the three radio systems known as WLAN (wireless local area network), Bluetooth and ZigBee, all of which operate with different technical features in the 2.4 gigahertz (GHz) frequency band, which is unlicensed almost throughout the world.

WLAN, whose features are specified in IEEE Standard 802.11 and which is specified mainly for wireless networking of personal computers at data rates of up to 54 megabits per second for high-speed data communication over distances of up to 300 meters, uses 11 or 13 static channels, albeit overlapping in the frequency spectrum, within the frequency band between 2.4 GHz and 2.4835 GHz. Of these channels, only three channels respectively do not overlap. Consequently, a disadvantage for use in radio systems for doors exists in that, for practical purposes, only three WLAN networks can be operated concurrently in immediate proximity. Furthermore, because of their high transmitting power and high data-transmission rates, WLAN radio systems have high power consumption and use relatively lengthy control information (known as headers) in the data packets, thus negatively impacting the required high-speed data transmission (short reaction time) and thus the use as a radio method for doors.

The radio system according to the ZigBee standard also operates in the 2.4 GHz frequency band, is intended for the use of wireless radio switches and radio sensors and should ensure a long battery life. ZigBee is designed for short ranges (10 to 75 meters) and is based on IEEE Standard 802.15.4. ZigBee uses 25 static channels within the 2.4 GHz frequency band. The disadvantages of ZigBee in a radio method for doors are that only a relatively low data-transmission rate of at most 250 kilobits per second is achieved and the response times are approximately 5 milliseconds (ms), which does not allow a rapid reaction to a dangerous situation of the door. Furthermore, at most 16 ZigBee channels can be operated concurrently in an interference-free environment, thus imposing a further restriction for large door systems, such as in a freight center. Because ZigBee uses static channels, devices networked with ZigBee cannot switch dynamically to an alternate channel if the preset channel is disturbed or blocked by another radio system, such as a mobile WLAN device. Certainly methods for dynamic frequency adaptations are also planned for ZigBee, but they are designed for reaction times of much longer than 10 ms.

Protocol frames of different lengths can be used for data transmission in ZigBee. According to the ZigBee standard, however, a protocol frame comprises at least one 8-byte address, one 5-byte preamble and one 2-byte checksum, and so its length is at least 15 bytes regardless of the useful information to be transmitted. This has the disadvantage that the time for transmission of short useful information, for example of 1 byte to 4 bytes, is a multiple of what is actually necessary for transmission. In addition, with a net data rate of 250 kilobits per second (kbps), data transmission takes place relatively slowly compared with the frequency band being used.

With the Bluetooth standard, which also belongs to the prior art, is specified in IEEE 802.15.1 and is intended for short-range radio networking of small mobile devices such as mobile telephones and PDAs with one another or with stationary computers and peripherals, a range up to 100 meters can be achieved with a 100-milliwatt transmitter. Bluetooth divides the available frequency band between 2.402 GHz and 2.480 GHz into 79 channels 1 MHz apart, and switches between them in a defined frequency hopping routine up to 1600 times per second, or in other words every 0.625 ms, and so a frequency hop already takes place within one communication cycle, or in other words between the end of the incoming data transmission and the beginning of the response. As regards a radio method for doors, Bluetooth has the disadvantage that it needs a relatively large processor capacity due to the rapid frequency hopping and thus has high power demand and needs expensive components, which is not compatible with long battery life. Furthermore, the process of synchronization between two Bluetooth communication partners lasts several seconds, thus preventing use for a door. Furthermore, it cannot be ruled out that interactions with other Bluetooth devices—such as mobile telephones—not allocated to the door may occur when these devices are in the sensing zone of the door. Certainly version 2.0 of Bluetooth provides the ability to select the channels being used by the frequency hopping method, for example by blocking individual channels. However, the criteria according to which this selection will be made is not specified.

In the Bluetooth standard, a protocol frame comprises at least a 9-byte access code, a 7-byte header, a 1-byte data header and a 2-byte checksum. Thus the protocol frame comprises at least 19 bytes regardless of the useful information to be transmitted, and thus is not compatible with high-speed data transmission of short useful information.

Furthermore, the frequency-hopping method of Bluetooth and the other known radio systems has the disadvantage that these systems unconditionally execute the frequency hops according to an internally defined sequence or to the random selection principle, and only after the frequency hop to the next channel do they check whether the channel is free at all for its own data transmission. This has the disadvantage that sometimes these systems may not transmit any data for a period longer than 100 ms, for example, since they are continuously hopping to already occupied channels. Hereby these systems are greatly restricted as regards use in transmission of safety-related data of a door and as regards the associated requirement of a rapid reaction time.

BRIEF SUMMARY OF THE INVENTION

The technical problem of the present invention is to provide a radio method for doors that equally satisfies the requirements listed hereinabove concerning low power consumption, rapid and reliable establishment of a connection (synchronization), high-speed data transmission, a frequency band that can be used worldwide, safe operation in coexistence with other radio systems, and the use of inexpensive components capable of operating safely.

This technical problem is solved by a method having the features according to the following. The inventive radio method for doors in the 2.4 GHz frequency band with a large number of operating channels, wherein a stationary unit is bidirectionally networked by means of a wireless radio connection with at least one battery-powered mobile unit and uses a frequency-hopping method with more than one channel, is characterized in that channel hops are executed in a time raster between 0.625 ms and 10 ms,
the channels used for the frequency-hopping method are adaptively selected,
at least one complete communication cycle comprising an incoming data transmission and a response takes place on one channel within the time raster,
the number of transmitted data is adapted to the useful data that must be transmitted, and
the synchronization for establishment of a connection between the stationary unit and the mobile unit takes place on an adaptively predetermined synchronization channel.

A first advantage of the inventive radio method for doors is seen in the fact that the radio method operates in the 2.4 GHz frequency band, at frequencies between 2.402 GHz and 2.480 GHz, since this frequency band is available for radio systems almost worldwide and permits a high data rate, such as 1 megabit per second. The use of this frequency band also has the advantage that a large number of standard components are available for it, thus permitting implementation of an inexpensive radio system.

According to the invention, there is further provided the use of a frequency-hopping method, wherein the operating channels being used by the radio method are adaptively redefined in order to switch only between those channels that have been recognized beforehand to be free channels. In this connection, the term "adaptive" is to be understood as automatic or manual identification and setting of operating channels.

The channel hops advantageously take place on the basis of a channel-hop table or of a channel-hop algorithm that utilizes the channel-hop table. These channel hops are executed synchronously, or in other words simultaneously, by the mobile unit and the stationary unit. The channel hop between the operating channels takes place according to a time raster that is identical for both communication units and advantageously is shorter than 10 ms. Within this time raster, a complete communication cycle composed of an incoming data transmission and a response takes place, so that the channel hop is executed only after completion of a communication cycle, with the advantage that only simple logic and small computing capacity are necessary, and the result that the channel-hopping method can be executed with inexpensive components and needs only little electric energy.

As an example, a complete communication cycle can be a data telegram of a first communication unit with a short status message about the status of the safety strip of the door and a short acknowledgment of the second communication unit, confirming error-free reception of the data telegram.

To ensure that the inventive radio method for doors is rapid and thus needs only little electric energy and in addition achieves high-speed transmission of safety-related data, it is planned to use short data packets, in which the respective length of useful data is only that necessary for the respective information to be transmitted. The transmittable information is advantageously limited to 32 bytes.

For normal use of a radio method for doors, it is sufficient to transmit a few bytes of useful information. As an example, this useful information contains binary status information about whether a safety device on the door has detected an obstruction or whether another contact is open or closed or, for example, about the current position of the door edge.

Furthermore, in the radio method for doors, the useful data are advantageously transmitted only with a small protocol frame, which contains only such protocol elements as are needed for performing a radio method for doors. Besides a 2-byte preamble, a 5-byte address and a 1-byte transceiver message, the protocol frame is composed of a 2-byte checksum and thus has a total length of 10 bytes.

The use of the frequency-hopping method in the 2.4 GHz frequency band additionally permits approximately worldwide use of the radio method for doors. A further advantage of the frequency-hopping method is that the radio method achieves greater operating safety hereby, since the probability that another radio system or another interfering variable will disturb the radio method or make data transmission impossible for a lengthy time decreases due to the cyclic changing of channels. This advantage is further improved by the adaptive selection of the channels being used, since potential disturbance of the radio method is already minimized in advance by the selection and use of the channels recognized beforehand as free.

Since the radio method for doors is intended for use with battery-powered mobile units, which are activated only when their function is necessary, a step for rapid synchronization of a mobile unit with a stationary unit is additionally provided in the method according to the invention. The rapid synchronization has the advantage that the radio method is quickly ready to operate, simultaneously ensuring in turn that only little electric energy is necessary. To achieve rapid synchronization, such synchronization takes place on at least one adaptively adjustable synchronization channel.

For a synchronization operation, the mobile unit, once activated, advantageously sends a synchronization signal on the synchronization channel. The synchronization signal is, for example, a short data sequence, which contains a unique identifier (address) of the mobile unit. After sending the synchronization signal, the mobile unit waits for a predefined synchronization waiting time for a response from a stationary unit, which response in turn contains a unique identifier (address) of the stationary unit. If the mobile unit receives an appropriate response from the stationary unit within the synchronization waiting time, the synchronization operation is complete and the normal operating process is started.

A synchronization operation takes place within a time of a few milliseconds (ms) and in each case needs less than 100 ms. A typical synchronization operation needs less than 30 ms.

In an advantageous embodiment, more than one synchronization channel is available for synchronization, and each synchronization channel is assigned its own priority. If, within the synchronization waiting time, the mobile unit does not receive a response to the synchronization signal sent by it, the mobile unit switches to the next synchronization channel in accordance with the defined priority and sends the synchronization signal on it once again. This operation is continued until the mobile unit receives a response from the stationary unit.

As the synchronization channel there are advantageously used only such channels that are known to have good transmission quality. According to a further embodiment, a synchronization channel may also be used as an operating channel.

Within a time raster that is shorter than the synchronization waiting time of the mobile unit, the stationary unit checks for the presence of a synchronization signal of a mobile unit allocated to it on one of the channels provided for synchronization. Such a query preferably takes place on the synchronization channel with the highest priority. If the stationary unit does not receive a synchronization signal on the synchronization channel with the highest priority, or if the stationary unit detects that the synchronization channel is faulty, it switches to another synchronization channel. The time raster used by the stationary unit is advantageously selected such that it can pass through all synchronization channels within the synchronization waiting time.

It is particularly advantageous when the radio method for doors uses at least 79 channels, because hereby it is possible to ensure that a sufficient number of free channels is available for each radio system even during concurrent operation of a plurality of similar radio systems. Furthermore, this number of channels has the advantage that the channels are relatively narrow, with the advantage in turn that free channels can be easily located.

In an advantageous embodiment, a difference of at least 25 MHz exists between the frequency of a first channel being used and the frequency present after a channel hop. This has the advantage that one channel hop will certainly to skip over a WLAN system operating in the same frequency band with, or that one channel hop will certainly go beyond the frequency range of an interfering WLAN system.

In an advantageous embodiment, the channel in which the next hop will arrive is selected by determination of a pseudo-random number, calculated with incorporation of the individual address of the stationary unit. Hereby it is ensured that the pseudo-random number of a first stationary unit differs with high probability from the pseudo-random number of a second stationary unit, since the construction of a pseudo-random number is frequently achieved on the basis of an internal timer, which under unfavorable circumstances may be running synchronously in a plurality of stationary units.

This embodiment has the advantage that two radio systems operating next to one another do not each run the risk of switching synchronously to these same channels and thus interfering with one another.

In a further embodiment, it is provided, for the case that the first communication unit does not receive an acknowledgment at all or at least not a positive acknowledgment from the second communication unit within a defined response time, that the first communication unit will send its data telegram one more time on the same channel to the second communication unit. Only if the first communication unit again does not receive an acknowledgment or at least not a positive acknowledgment to the second data telegram will it switch channels according to a method defined uniformly for all communication units and attempt to resend the data telegram to the second communication unit on the newly selected channel. This has the advantage of further reduction of the system reaction times to possible transmission errors.

Particularly advantageously, the time raster after which the channel hop is executed is shorter than or equal to 2.5 ms. This has the advantage that a communication cycle is executed rapidly and thus that a rapid reaction time of the overall system can be guaranteed. Furthermore, a second transmission attempt can be made on a further channel within a time of 5 ms, which represents an advantageous time interval for maintaining necessary times of reaction to dangerous situations of the door.

In a further advantageous embodiment, certain channels for transmission of safety-related data are allocated to each radio system for doors. Therewith, if radio systems for doors are spatially close to one another, it is possible to prevent the possibility of channel collisions between such systems during transmission of safety-related data. During transmission of safety-related data, channel hops take place only on that respective subgroup of channels that do not overlap with other radio systems for doors.

For adaptive selection of the operating channels, the channel-specific transmission quality of the available operating channels is checked and filed in a channel-occupancy table. The channel-occupancy table can be generated by the stationary unit or by the mobile unit or by both units. This channel-occupancy table is then exchanged between the stationary unit and the mobile unit, so that both units operate with an identical channel-occupancy table.

If the channel-occupancy table has been generated by both units and exchanged between the units, it is advantageously provided that both units will use only those channels that have been identified by both units as channels with good transmission quality.

In an advantageous embodiment, the channel-occupancy table is regenerated cyclically in a predetermined time raster.

In a further advantageous embodiment, the instant at which the channel-occupancy table is regenerated is triggered by an event. Such an event can be, for example, the end of a door movement or the door movement itself. However, an event can also be the end of a communication cycle. The event-dependent generation of the channel-occupancy table has the advantage that it is ensured at this instant that both communication units are active and can communicate with one another and that no time-critical transmission of safety-related data has to take place.

A further embodiment provides that the channel-occupancy table is constructed by manual intervention of a user, for example during installation of the door or in case of need. This embodiment has the advantage that the devices that execute the radio method for doors do not need any sensing devices to determine the channel-specific transmission quality, and it offers the advantage that the operating person can check whether the settings made are correct.

For determination of the channel-specific transmission quality, it is possible to employ a plurality of mutually independent methods, of which either only one or else a combination can be used.

In an advantageous embodiment, the channel related transmission quality is determined by measuring the signal field strength with which a transmitted signal of the respective other unit can be received on the individual channels. This has the advantage that very precise estimates of the potential transmission quality are possible.

In a further embodiment, the channel-specific transmission quality is determined by performing a plurality of test transmissions, each with a different transmission power, on one channel. The needed transmission power represents the criterion for the channel-specific transmission quality. This method has the advantage that the respective receiving station does not need a measuring device to determine the signal field strength, but instead only digital information as to whether transmission is possible or not possible has to be determined.

In a further embodiment, the channel-specific transmission quality is determined on the basis of the interference field strength received by the respective channel and caused on the channel by other transmitting systems. This has the advantage that the channel-specific transmission quality can be determined without the help of the respective other unit.

In a further embodiment, the channel-specific transmission quality is determined by channel-specific counting of transmission errors, for example within a defined time interval. The more frequently transmission errors are recorded on a channel, the poorer is the transmission quality on the respective channel. This method has the advantage that it can be performed relatively simply and inexpensively by software.

For further reduction of the energy demand of the radio method for doors, it is provided that the communication frequency will be adapted to fit the situation. This means that, in situations in which no safety-related data have to be exchanged, communications will take place less frequently than in situations in which safety-related data have to be exchanged. For this purpose the stationary unit can communicate the needed communication frequency to the mobile unit.

A further reduction of the energy demand of the radio method for doors can be achieved by placing the mobile unit or at least parts of the mobile unit in a mode, depending on the situation, in which they consume less energy. This can be achieved, for example, by the fact that the processor or processors executing the radio method for doors can be operated with different clock frequencies, and that the maximum clock frequency is activated only when safety-related data are to be transmitted. Another possibility is to deactivate the transmitter/receiver used to conduct the method.

The inventive radio method therefore comprises a rapid, energy-saving and reliable radio method that can also be used worldwide for wireless networking of a stationary door controller for control of motor-driven doors, whose door controllers are equipped with a large number of mobile units. The radio method is particularly suitable for networking components that are mounted on a movable door wing wirelessly with the stationary door controller, examples being sensors—known by the term safety strips—that detect a collision of the door wing with an obstruction, monitoring contacts of wicket doors or devices referred to as crash sensors.

The inventive radio method for doors is particularly suitable for what are known as high-speed doors, although it can also be used equally well for all other known motor-driven doors and barriers.

BRIEF DESCRIPTION OF THE DRAWINGS

Further features and advantages of the invention will become evident on the basis of the attached drawing, wherein a door and a channel occupancy are illustrated merely by way of example, and wherein.

DESCRIPTION OF THE PREFERRED EMBODIMENTS

Figure 1:
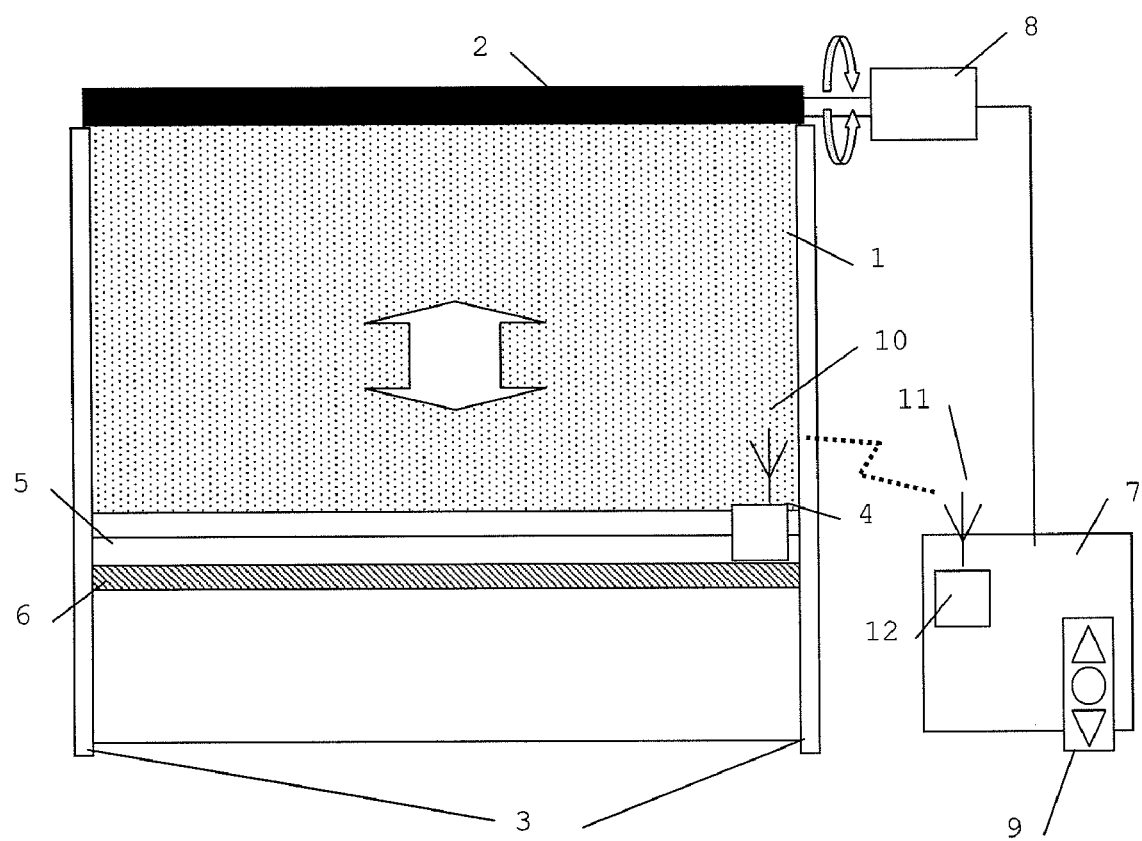
FIG. 1 shows a schematic diagram of a door.

FIG. 1 shows a possible field of use of the radio method for doors by means of the example of a door 1, which is guided in guide rails 3 and can be moved via a door shaft 2 by means of a door drive 8. The illustrated door is a film-type door, in which door 1 is wound around door shaft 2 during the upward movement. In the process, door drive 8 is controlled by a fixed door controller 7, which can be commanded via control element 9. Fixed door controller 7 additionally contains a stationary unit 12, which can communicate wirelessly via an antenna 111 with an antenna 10 that is mounted on the door and is in contact with a battery-powered mobile unit 4. On a lower edge of door 1 there is disposed a closing profile 5, which imparts stability to door 1. On the lower edge of closing profile 5 there is mounted a safety sensor 6, which can be designed, for example, as a photoelectric cell or electric contact or as a pneumatic switching element, and which can exchange information wirelessly between safety sensor 6 and fixed door controller 7 by means of mobile unit 4, antennas 10 and 11 and stationary unit 12.

Figures 2, 3:
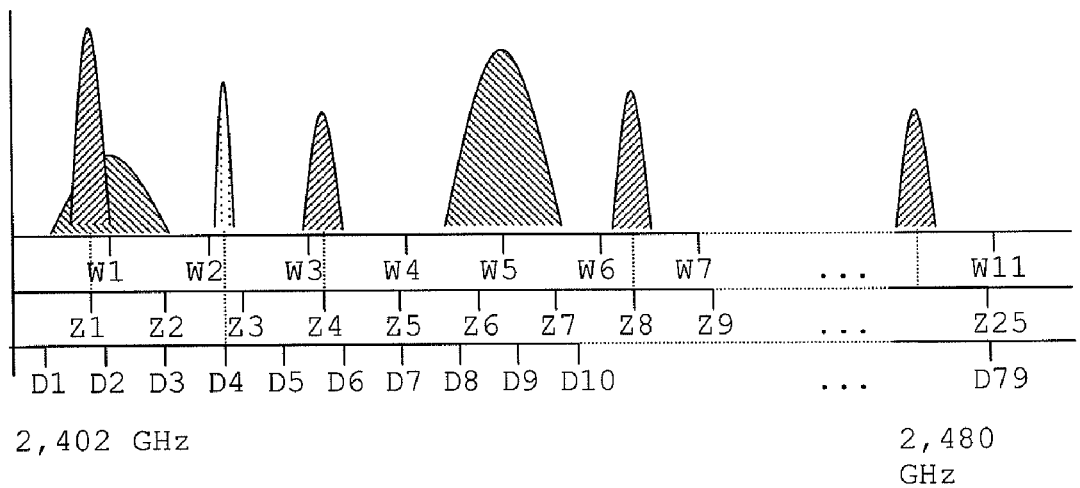
FIG. 2 shows a frequency band used by different radio systems.
FIG. 3 shows a channel-occupancy table.

FIG. 2 schematically shows a frequency band being used by different radio systems. In this example, a radio system denoted by the letter W is operating on channels W1 and W5. The channels of this radio system denoted by W have a relatively broad channel bandwidth. The radio system denoted by W can be, for example, a WLAN system, in which copious data can be transmitted in a short time, for which purpose a broad channel bandwidth is a prerequisite.

Also operating on the illustrated frequency band is a further radio system, denoted by the letter Z, whose channels have a narrower channel bandwidth than the radio system denoted by W. Hereby it is possible in principle for a plurality of radio systems denoted by Z to operate on the same frequency band.

At the location W1/Z1, however, the transmitters of the two radio systems W and Z overlap, which in practice can lead to a distinct reduction of the transmission quality or to a breakdown of the data transmission of the radio systems colliding in this way.

Furthermore, FIG. 2 also shows a radio system denoted by D, in this case the inventive radio system for doors, wherein the channel bandwidth is even narrower than that of radio system Z.

Because of the narrow bandwidth of inventive radio system D, the possibility exists that a large number of similar radio systems can use the same frequency band without influencing one another, and it has the advantage of a high probability that one of channels D1 to Dn is free, or in other words not being used by another radio system.

According to the invention, it is provided that at least stationary unit 12 cyclically analyzes the entire frequency band, for example in a fixed time raster or on the basis of an external event or, for example, following a communication between stationary unit 12 and mobile unit 4, to determine whether and with which signal strengths other radio systems are operating on the same frequency band.

Stationary unit 12 stores the result of this analysis in a channel-occupancy table, an example of which is illustrated in FIG. 3. In the channel-occupancy table illustrated in Table 3, the channels recognized according to FIG. 2 to be free channels are denoted by "1", while the channels occupied by other systems are denoted by "0".

Furthermore, the channel-occupancy table in FIG. 3 contains an additional row, in which the synchronization channels are entered. The synchronization channels are denoted by S1, S2 and S3, although this represents only one example of the possible number of synchronization channels. The synchronization channel denoted by S1 has the highest priority for a synchronization operation between stationary unit 12 and mobile unit 4. Synchronization channels S2 and S3 have the next priority in numerical order.

After fixed unit 12 has generated the channel-occupancy table, it transmits this to mobile unit 4, in which it is stored.

This channel-occupancy table, regenerated adaptively in each case, is then used for the frequency-hopping method during communication between fixed unit 12 and mobile unit 4.

Because the data telegrams have only short length (small data content) and because the rate of frequency hops is limited, by the fact that a complete communication cycle including at least one possible repetition without a frequency hop is executed, the inventive radio method for doors is very economical toward batteries and at the same time is rapid. By virtue of the adaptive capability, which is achieved by the respective newly generated frequency-occupancy table, and by virtue of the definition of prioritized synchronization channels, the radio method is also very safe in operation and at the same time rapid, thus satisfying the main requirements imposed on a radio method for doors.

REFERENCE NUMERALS

1 Door
2 Door shaft
3 Guide rails
4 Mobile unit
5 Closing profile
6 Safety sensor
7 Door controller
8 Door drive
9 Control element
10, 11 Antennas
12 Stationary unit
D Radio system
D1 to Dn Channels
S1, S2, S3 Synchronization channels
W Radio system
W1 Channel
W5 Channel
Z Radio system

What is claimed is:

1. A radio method for controlling doors in the 2.4 GHz frequency band with a large number of operating channels, wherein a stationary unit is bidirectionally networked by means of a wireless radio connection with at least one battery-powered mobile unit and uses a frequency-hopping method with more than one channel, comprising the steps of:

executing channel hops in a time raster between 0.625 ms and 10 ms, adaptively selecting the channels ($D_1$ to $D_n$) used for the frequency-hopping method, providing at least one complete communication cycle comprising an incoming data transmission and a response takes place on one channel ($D_1$ to $D_n$) within the time raster, adapting the number of transmitted data to the useful data that must be transmitted, and synchronizing the establishment of a connection between the stationary unit and the mobile unit on an adaptively predetermined synchronization channel.

2. A radio method for doors according to claim 1, further comprising the step of providing a plurality number of synchronization channels that are available for synchronization, wherein each synchronization channel has its own priority and switching to a synchronization channel with lower priority takes place after a failed synchronization attempt on a synchronization channel with higher priority.

3. A radio method for doors according to claim 1, further comprising the step of using only those channels known to have good transmission quality adaptively for synchronization.

4. A radio method for doors according to claim 1, comprising the step of checking for the presence of a synchronization signal on all synchronization channels by the stationary unit during the synchronization waiting time of a mobile unit.

5. A radio method for doors according to claim 1, comprising the step of dividing the frequency band into at least 79 channels.

6. A radio method for doors according to claim 1, further comprising the step of providing a channel hop between a first and a second channel ($D_1$ to $D_n$) that corresponds to a frequency hop of at least 25 MHz.

7. A radio method for doors according to claim 1, comprising the step of determining the channel ($D_1$ to $D_n$) in which the next hop will arrive using a pseudo-random number calculated with incorporation of the individual address of the stationary unit.

8. A radio method for doors according to claim 1, comprising the step of repeating a data transmission on the same channel ($D_1$ to $D_n$) in the case of a transmission error.

9. A radio method for doors according to claim 1, comprising the step of providing channel hops only between channels ($D_1$ to $D_n$) during transmission of safety-related data.

10. A radio method for doors according to claim 1, comprising the steps of
  determining the channel-specific transmission quality in the stationary unit or in the mobile unit and
  transmitting the channel-occupancy table determined in this way to the respective unit that has not determined a channel-specific transmission quality.

11. A radio method for doors according to claim 10, comprising
  determining the channel-specific transmission quality simultaneously in the stationary unit and in the mobile unit and
  exchanging the channel-occupancy table determined in this way between the two units and used for further operation of only those channels ($D_1$ to $D_n$) that have been determined by both units to be channels with good transmission quality.

12. A radio method for doors according to claim 10, comprising the step of regenerating the channel-occupancy table cyclically in a predetermined time raster.

13. A radio method for doors according to claim 10, comprising the step of regenerating the channel-occupancy table on the basis of an event.

14. A radio method for doors according to claim 10, comprising the step of regenerating the channel-occupancy table by a manual intervention.

15. A radio method for doors according to claim 1, comprising the step of determining the channel-specific transmission quality by measuring the signal field strength of a transmitted signal of the respective other unit.

16. A radio method for doors according to claim 1, comprising the step of determining the channel-specific transmission quality by test transmissions, each with a different transmission power.

17. A radio method for doors according to claim 1, comprising the step of determining the channel-specific transmission quality by measuring an interference field strength on each channel ($D_1$ to $D_n$).

18. A radio method for doors according to claim 1, comprising the step of determining the channel-specific transmission quality by counting transmission errors.

19. A radio method for doors according to claim 1, comprising the step of adapting the communication frequency to fit the situation.

20. A radio method for doors according to claim 1, comprising the step of adapting the clock frequency of the microprocessors executing the method to fit the situation.

21. A radio method for doors in the 2.4 GHz frequency band with a large number of operating channels, wherein a stationary unit is bidirectionally networked by means of a wireless radio connection with at least one battery-powered mobile unit and uses a frequency-hopping method with more than one channel, characterized in that:
  channel hops are executed in a time raster between 0.625 ms and 10 ms, the channels ($D_1$ to $D_n$) used for the frequency-hopping method are adaptively selected,
  at least one complete communication cycle comprising an incoming data transmission and a response takes place on one channel ($D_1$ to $D_n$) within the time raster,
  the number of transmitted data is adapted to the useful data that must be transmitted, and
  the synchronization for establishment of a connection between the stationary unit and the mobile unit takes place on an adaptively predetermined synchronization channel (S1, S2, S3).

\* \* \* \* \*